Jan. 8, 1929.

A. J. CHAPIN 1,698,011

VEHICLE WHEEL AND BRAKE

Filed Sept. 28, 1922

INVENTOR
ALBERT J. CHAPIN
BY *Wm. M. Cady*
ATTORNEY

Patented Jan. 8, 1929.

1,698,011

UNITED STATES PATENT OFFICE.

ALBERT J. CHAPIN, OF GLENDALE, CALIFORNIA, ASSIGNOR TO THE WESTINGHOUSE AIR BRAKE CO., OF WILMERDING, PENNSYLVANIA, A CORPORATION OF PENNSYLVANIA.

VEHICLE WHEEL AND BRAKE.

Application filed September 28, 1922. Serial No. 591,201.

This invention relates to brakes, and more particularly to a fluid pressure operated brake adapted for motor vehicles.

One object of my invention is to provide a fluid pressure controlled brake associated with the vehicle wheel structure.

The construction, according to my invention, is such that both the front as well as the rear wheels of the vehicle may be used as braking units and since the brake is in and part of the wheel structure, there are no mechanical difficulties to be overcome because of steering, when brakes are applied to the front wheels.

The construction also permits the application of a fluid pressure brake to a motor vehicle without special adaptations for different makes and designs of cars, as the construction merely requires the substitution of the combined wheel and brake in place of the existing vehicle wheel, in the same way that a disk wheel may be applied to take the place of a spoked wheel, for example.

Another object of my invention is to provide an improved vehicle wheel of the disk type.

Other objects and advantages will appear in the following more detailed description of the invention.

Figure 1:
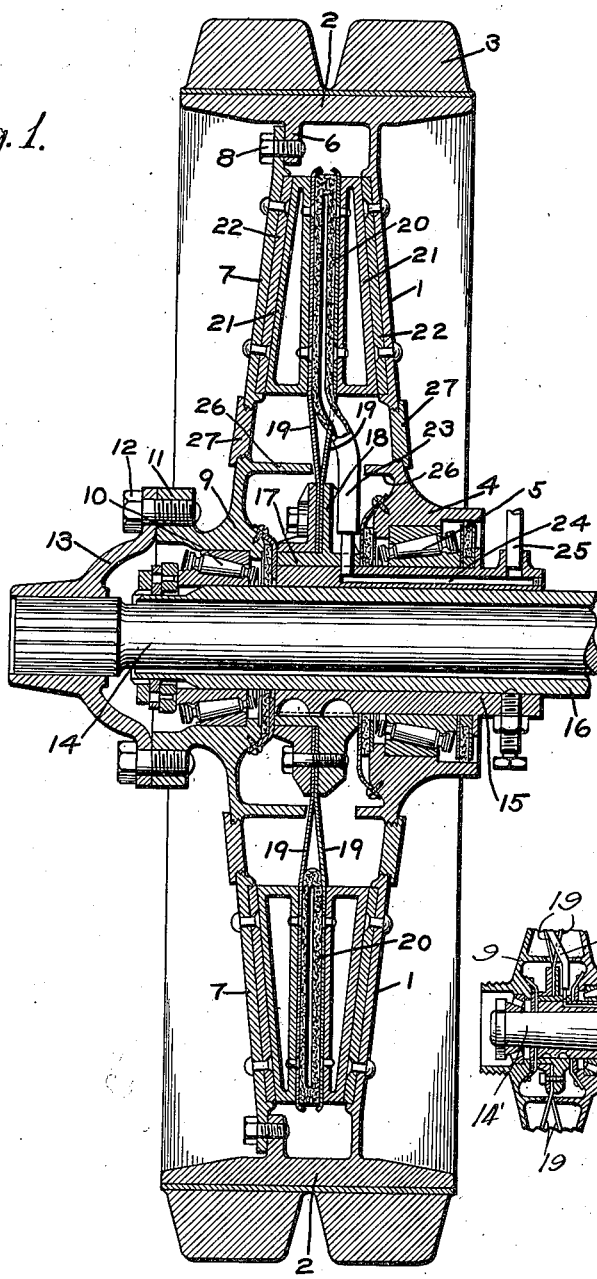
Figure 2:
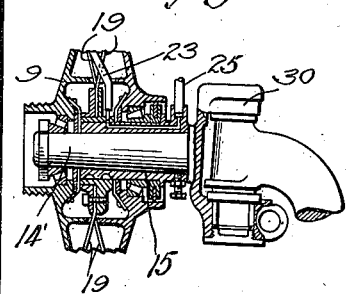

In the accompanying drawing, Fig. 1 is a central sectional view of a vehicle wheel and brake embodying my invention; and Fig. 2 a sectional view showing the application of my invention to a front wheel of a motor vehicle.

As shown in the drawing, the construction may comprise a dished steel disk 1, having cast or formed integrally therewith an outer annular rim 2 which may be adapted to carry a solid tire 3, as shown in the drawing, or a pneumatic tire of the usual construction.

Centrally, a hub 4 is cast or formed integrally with the disk 1 and mounted in the hub is a wheel bearing 5, which may be a conical roller bearing, as shown in the drawing, or other desired type of bearing.

Spaced from the disk 1, the rim 2 is provided with a flange 6 and a dished disk 7 is adapted to be secured to said flange by means of a plurality of bolts 8. The disk 7 has cast or formed integrally therewith a hub 9 within which is mounted a wheel bearing 10.

If for a rear wheel, the hub 9 may be provided with a flange 11 to which is secured by bolts 12 a cap 13 constructed to be applied to the keyed end of the corresponding rear drive shaft or axle 14.

For a front wheel construction, the wheel is designed to be applied in the same manner as the usual front vehicle wheel is applied. In the case of a rear wheel, the wheel is mounted on a sleeve 15 secured to the usual axle housing 16.

The fluid pressure brake mechanism may comprise a hub 17 secured to the sleeve 15 intermediate the wheel hubs 4 and 9. To a flange 18 of the hub is secured a pair of thin metal disks 19 which are spaced apart so as to provide space for an annular flexible cell or diaphragm chamber 20 and secured to each disk is an annular metal drum or brake shoe 21 which is provided with an outer friction face disposed in parallel relation to the wheel disks 1 and 7. An annular removable wear plate 22 may be secured to each wheel disk to provide a friction face for the engagement of the brake shoes.

The diaphragm cell 20 is provided with a flexible tube connection 23 which is connected to a passage 24 in the sleeve 15 and connected to passage 24 is a pipe 25 through which fluid under pressure may be supplied to and released from the diaphragm cell 20.

In operation, the brake disks 19 and the brake shoes 21 being held stationary through being secured to the stationary sleeve 15, when fluid under pressure is supplied through pipe 25 to the diaphragm cell 20, said cell expands laterally and forces the brake shoes 21 against the friction plates 22 which revolve with the vehicle wheel, thus setting up a frictional resistance which acts as a braking force to stop or retard the vehicle.

In order to prevent particles which are ground off through the engagement of the braking faces from dropping down and getting into the wheel bearings, the disks 1 and 7 may be provided with annular flanges 26 which extend from the disk to close proximity with the central brake disks 19 and demountable plugs 27 may be provided in the disks 1 and 7 above the flanges 26, so that by unscrewing the plugs, openings may be provided through which accumulated dirt and particles produced by the abrasion of the friction braking faces may be removed.

With the above described construction, the brake being contained in the wheel itself, a motor vehicle may be readily equipped with fluid pressure brakes by merely replacing the ordinary vehicle wheels with wheels constructed in accordance with my invention. The construction also permits the use of fluid pressure brakes on the front wheels of the vehicle without interfering in any manner with the steering mechanism and without requiring any modification or change in the existing construction.

In Fig. 2, the invention is shown as applied to a front wheel of a motor vehicle having the usual steering knuckle 30 provided with a stub shaft 14' on which the wheel is mounted. In this case, the sleeve 15 is secured to the shaft 14' instead of to the axle housing 16 of the Fig. 1 construction.

By making the disk wheel in two parts with two hubs, each disk may be cast integral with the corresponding hub, thus obviating the use of loose or bolted connections between the hub and the disks.

The construction described also permits the casting of the wheel parts providing a central chamber, without requiring the use of cores.

The features of my invention relating to the vehicle wheel per se are not claimed herein, since the same comprises the subject matter of my divisional application, Serial No. 619,748, filed February 17, 1923.

Having now described my invention, what I claim as new and desire to secure by Letters Patent, is:—

1. The combination with a vehicle wheel including a pair of disks spaced apart to form a chamber, of a braking member mounted in said chamber and operated by fluid under pressure supplied thereto to engage said disks.

2. The combination with a vehicle wheel comprising a rim and a pair of disks carrying said rim and spaced apart to form a chamber and an axle housing on which said wheel is mounted, of a braking member carried by said housing and mounted in said chamber.

3. The combination with a vehicle wheel comprising a pair of disks spaced apart to form a chamber and a rim secured to and supported by said disks, of an axle housing on which said wheel is mounted and a braking member, non-rotatably secured to said housing and mounted within said chamber.

4. The combination with a vehicle wheel comprising a rim and a pair of disks secured to said rim and spaced apart to form a chamber and having braking faces, of an expansible braking member mounted in said chamber and operable by fluid under pressure supplied to said member for engaging said braking faces.

5. The combination with a vehicle wheel comprising a pair of disks spaced apart to form a chamber and a rim secured to and wholly supported by said disks, of an expansible braking cell mounted in said chamber and adapted upon expansion to engage said disks.

6. The combination with a vehicle wheel including a pair of disks spaced apart to form a chamber and having braking faces, of an expansible braking cell mounted in said chamber and carrying braking faces adapted to engage the disk braking faces and means through which fluid under pressure is supplied to said cell.

7. The combination with a vehicle wheel including a pair of disks spaced apart to form a chamber, of disks non-rotatably mounted in said chamber, a flexible braking cell mounted between said disks and means through which fluid under pressure is supplied to said cell.

8. The combination with a vehicle wheel including a pair of disks spaced apart to form a chamber, of disks non-rotatably mounted in said chamber, a flexible braking cell mounted between said disks, brake shoes carried by said disks and adapted to engage braking surfaces carried by the wheel disks, and means through which fluid under pressure is supplied to said cell.

9. The combination with a vehicle wheel including a pair of disks spaced apart to provide a chamber, an axle secured to said wheel, and a non-rotating housing for said axle on which said wheel is rotatably mounted, of a braking member secured to said housing, and fluid pressure means for effecting frictional engagement between said braking member and a wheel disk.

10. In a vehicle brake, the combination with a vehicle wheel swiveled for steering movement, of spaced disk brake members secured to said wheel to rotate therewith, a coacting pair of brake shoes between said disks, means forming a fluid pressure chamber between said shoes expansible under interior pressure to frictionally engage said shoes with said disks, a spindle journaling said wheel, and means for delivering a fluid under pressure to said chamber independently of said spindle in any position of steering movement of the wheel.

11. In a vehicle brake, the combination with a vehicle wheel, a vehicle axle, and means mounting said wheel rotatively on said axle, a pair of spaced disk brake members secured to said wheel to rotate therewith, a coacting pair of brake shoes between said disks, means forming a fluid pressure chamber between said shoes expansible under interior pressure to frictionally engage said shoes with said disks, the inner of said disks being formed with a central opening accommodating the axle, and means passing through said opening independently of the axle for delivering a fluid under pressure to said chamber.

In testimony whereof I have hereunto set my hand.

ALBERT J. CHAPIN.